United States Patent
Szabo et al.

(10) Patent No.: US 8,933,633 B1
(45) Date of Patent: Jan. 13, 2015

(54) BRIGHT-FROM-THE-START COMPACT FLUORESCENT LAMP WITH LUMEN-SHIFT ELIMINATION CIRCUITRY

(71) Applicant: General Electric Company, Schenectady, NY (US)

(72) Inventors: Gabor Szabo, Budapest (HU); Jacint Gergely, Budapest (HU); Sandor Lukacs, Veroce (HU); Peter Lucz, Dunakeszi (HU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/044,411

(22) Filed: Oct. 2, 2013

(51) Int. Cl.
*H05B 35/00* (2006.01)
*H05B 37/00* (2006.01)
*H05B 39/00* (2006.01)
*H05B 41/00* (2006.01)
*H05B 37/02* (2006.01)
*H05B 39/04* (2006.01)

(52) U.S. Cl.
CPC ............ *H05B 37/02* (2013.01); *H05B 37/0209* (2013.01); *H05B 39/04* (2013.01)
USPC ............... 315/178; 315/50; 315/92; 315/118; 315/309

(58) Field of Classification Search
None
See application file for complete search history.

(56) References Cited

U.S. PATENT DOCUMENTS

| | | |
|---|---|---|
| 5,491,385 A | 2/1996 | Nilssen |
| 8,008,866 B2 | 8/2011 | Newman et al. |
| 8,228,002 B2 | 7/2012 | Corrigan et al. |
| 8,232,733 B2 | 7/2012 | Newman et al. |
| 8,339,048 B2 | 12/2012 | Newman et al. |
| 8,354,803 B2 | 1/2013 | Newman et al. |
| 2011/0234094 A1* | 9/2011 | Wursching et al. ............. 315/51 |
| 2012/0187834 A1* | 7/2012 | Ni et al. ......................... 315/51 |

FOREIGN PATENT DOCUMENTS

EP 2355131 8/2011

* cited by examiner

*Primary Examiner* — Anh Tran
(74) *Attorney, Agent, or Firm* — GE Global Patent Operation; Peter T. DiMauro

(57) ABSTRACT

A lamp including a primary light source and a secondary light source, and a secondary light source control circuit configured to provide an operating voltage to the secondary light source. The secondary light source control circuit including a resistance element having an initial resistance which changes in response to being exposed to a temperature above a predetermined threshold. The secondary light source control circuit including a charging branch resistance-capacitance time constant that is configured to change with a change in the resistance element resistance.

17 Claims, 4 Drawing Sheets

BRIGHT-FROM-THE-START COMPACT FLUORESCENT LAMP WITH LUMEN-SHIFT ELIMINATION CIRCUITRY

BACKGROUND

Lighting costs in a typical home can account for about one-fifth of the household's energy consumption. To reduce this consumption, and its associated costs, compact fluorescent lamps (CFLs) can be used to replace the more traditional incandescent lamp. CFLs can have a slow startup time to produce full lumen output.

Bright-From-The-Start (BFTS) CFLs can include a halogen light source in addition to the primary compact fluorescent tube within the CFL. The halogen light source can produce a sufficient amount of light from the beginning of the CFL operation. When the CFL is energized, the halogen light source produces maximum light output, which compensates for the low lumen output of the CFL during its startup period.

However, the halogen light source requires more power than the CFL light source, and typically has a shorter lifetime than the CFL light source. Conventional BFTS CFLs that include a halogen light source turn the halogen light source off after a predetermined time. The sudden lumen shift of the halogen light source from one-hundred percent to zero-percent light output can be significantly perceptible and sometimes becomes quite annoying for the human eye. The higher the wattage of the halogen light source, the more perceptible the lumen shift can be.

BRIEF DESCRIPTION

In accordance with embodiments, a BFTS CFL includes an electronic circuitry that controls the lumen output of a secondary light source to decrease the secondary light source's lumen output from a maximum intensity to a zero lumen output at a controlled rate. The control is achieved relying on thermal conditions within the BFTS CFL to linearly change an RC time constant of the circuit to control the reduction of the secondary light source output. In accordance with some embodiments, the secondary light source can be a halogen lamp. In accordance with other embodiments, different light source technologies can be implemented as the secondary light source—for example, LED technology, pellet-dosed CFL, etc.

DETAILED DESCRIPTION

Figure 1:
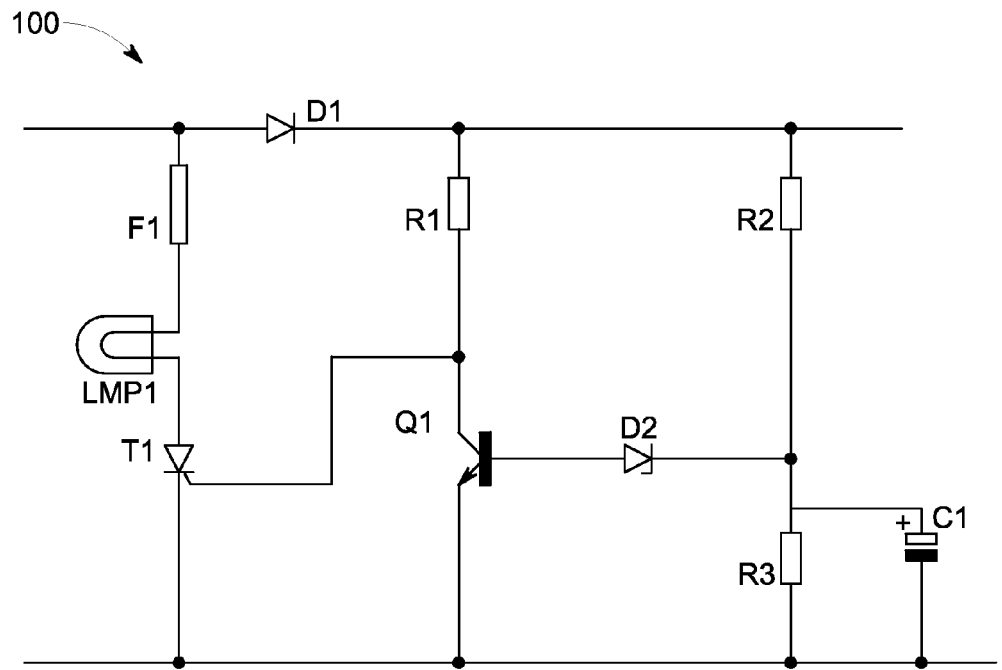
FIG. 1 schematically depicts a conventional BFTS CFL halogen light source control circuit.

FIG. 1 schematically depicts conventional halogen light source control circuit 100. Lamp LMP1 is the halogen light source, which is in series with thyristor (or silicon controlled rectifier (SCR)) T1. When circuit 100 is initially energized, transistor Q1 is off and the gate of thyristor T1 is turned on, allowing conduction through the thyristor. This current flow allows lamp LMP1 to emit light. The RC time constant of resistor R2 in series with capacitor C1 controls the ramp-up of the voltage at the cathode of zener diode D2. When the zener diode breakdown is exceeded, transistor Q1 turns on and conducts. Conduction across transistor Q1 lowers its collector voltage to almost ground. This decrease in conductor voltage causes the gate of thyristor T1 to turn off, which stops conduction through the thyristor and turns lamp LMP1 off. Control circuit 100 determines the period of time that lamp LMP1 emits light based on the RC time constant of resistor R3 and capacitor C1. Operation of control circuit 100 requires rectification of the AC line voltage input to provide control circuit 100 with a DC voltage source as its operating supply. Thermal fuse F1 is a non-resettable fuse which opens should the lamp temperature exceeds a specified value. When fuse F1 opens, the secondary light source switches OFF to protect the lamp in extreme conditions.

Diode D1 separates the voltage across a buffer capacitor (not shown) located parallel to the circuit branch of resistor R2/resistor R3, from the output voltage of a bridge rectifier (not shown) connected across the circuit branch including fuse F1, lamp LMP1, and thyristor T1. Diode D1 retains zero points in the voltage across the thyristor, so the thyristor can stop conduction. Without diode D1, the thyristor would not stop conducting (leaving lamp LMP1 always ON), even when the thyristor gate terminal goes to ground (due to opening of transistor Q1).

Figure 2:
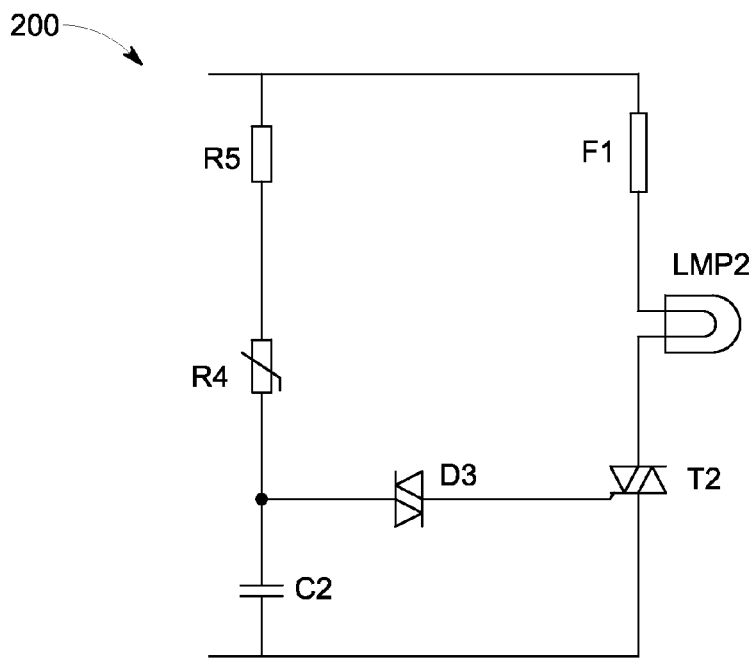
FIG. 2 schematically depicts a BFTS CFL secondary light source control circuit in accordance with embodiments.

FIG. 2 schematically depicts secondary light source control circuit 200 in accordance with embodiments. Control circuit 200 can be connected to the AC line voltage input of the BFTS CFL for operating supply voltage. This connection to the AC line input can be in parallel with a half-bridge inverter electronic CFL ballast which provides operating voltage to the CFL tube.

Control circuit 200 includes triac T2 connected in series with secondary light source LMP2. One terminal of diac D3 is in series with the gate electrode of Triac T2. A second terminal of diac D3 is coupled to the series junction of capacitor C2 and thermistor R4. Both the capacitor and thermistor are in series with resistor R5 to form a charging branch. In accordance with some implementations, a zener diode can be substituted in control circuit 200 for diac D3. Operation of control circuit 200 will be discussed based on a diac implementation.

During each half period of the AC line voltage input, capacitor C2 charges through thermistor R4 and resistor R5. When the voltage charge across capacitor C2 reaches the breakover voltage of diac D3, the diac starts to conduct which provides current to the gate electrode of triac T2.

Diac D3 remains in conduction until the current through the diac drops below its holding current. Below the holding current, the diac can revert back to a high-resistance (non-conducting) state. The behavior of the diac is bi-directional (i.e., independent of current direction), and operates with the AC line voltage input without the need for rectification.

Once the diac provides the signal at the gate electrode of Triac T2, the triac begins to conduct. A triac can continue to conduct until the current flowing through the triac decreases below the triac's holding current.

The triac conducts while its current is above the holding current. In every half-period of the supply voltage there is a "zero-point." This zero-point causes the triac to cease conduction in every half period (for about 8.33 msec). The triac begins to conduct again when capacitor C2 reaches the specified threshold voltage for diac D3. A "dead time" exists during the delay between the zero-point and the point when the triac starts to conduct again. In accordance with an embodiment, as the resistance of thermistor R4 increases (i.e., a thermistor having a positive temperature coefficient), the "dead time" also increases causing the RMS voltage on the secondary light source to decrease.

In control circuit 200, the intensity of the light emission from secondary light source LMP2 is directly related to the amount of triac current. As the triac current drops, the light emission from secondary light source LMP2 can decrease. In other implementations of the control circuit, an indirect relationship can be implemented.

In accordance with embodiments, a change to the RC time constant (determined by the values of a charging branch that includes thermistor R4, resistor R5 and capacitor C2) can vary the light output intensity of the secondary light source.

From the de-energized state, when the lamp is initially switched ON, the charging branch RC time constant is chosen to produce the maximum conduction angle on triac T2, so the secondary light source can produce its maximum light. In accordance with an implementation, the increased conduction angle impacts the intensity of light emitted by a halogen lamp.

A change in the resistance of thermistor R4 dynamically changes the charging branch RC time constant. In accordance with an embodiment, thermistor R4 has a positive temperature coefficient (PTC) (the resistance of the thermistor increases with an increase in temperature). The half-period, dead-time causes the triac and diac D3 to cease conduction. Elimination of the gate current at the gate of triac T2 (which is provided by the diac) stops the triac from conducting. The dead-time increases linearly with an increase in the resistance of the PTC thermistor.

Thermistor R4 is positioned within the lamp optical housing in relation to a heat source so that the heat source affects the thermistor's resistance. In accordance with embodiments, thermistor R4 can be shielded from the heat source to minimize the direct effect of the heat source during the CFL initial start-up period. The thermistor can be shielded by inclusion of a thermal shield within the lamp optical housing, or by positioning the thermistor in the heat shadow of CFL tube.

In accordance with embodiments, CFL primary lamp can be the heat source used to impact the resistance of thermistor R4. The secondary light source can be positioned adjacent to the CFL arc tube, and thermistor R4 can be positioned adjacent to one of the arc tube ends on a side distal from the secondary light source. In other embodiments, a thermal shield can be positioned between the heat source and thermistor R4. The thermal shield can be formed from a heat insulating material, or another material that can place thermistor R4 in a thermal shadow, so that the thermistor is not exposed directly to radiated heat from the heat source. By thermally shadowing the thermistor, its resistance temperature (a predetermined threshold) is reached at a later point in time then if the thermistor was directly radiated with heat from the heat source.

By thermally shielding the thermistor, during an initial first period (e.g., up to about 120 seconds) the resistance of thermistor R4 does not change significantly. After the temperature exceeds the thermistor's reference temperature, the resistance of thermistor R4 rapidly changes—with perhaps exponential characteristics. This rapid change in resistance changes the bias of control circuit 200 with the impact of turning off triac T2. Accordingly, the secondary light source can produce its maximum light for a certain time period set by the initial charging branch RC time constant determined by "cold" thermistor R4, resistor R5 and capacitor C2. As the thermistor crosses its reference temperature, the light intensity from the secondary light source begins to decrease until it switches OFF fully. The rate of decrease in secondary light source intensity is related to the change of thermistor R4 resistance. This relationship between light source intensity and thermistor resistance is based on a thermal connection between a heat source and the thermistor.

Thermal fuse F1 is a non-resettable fuse which opens should the lamp temperature exceeds a specified value. When fuse F1 opens, the secondary light source switches OFF to protect the lamp in extreme conditions.

Figure 3:
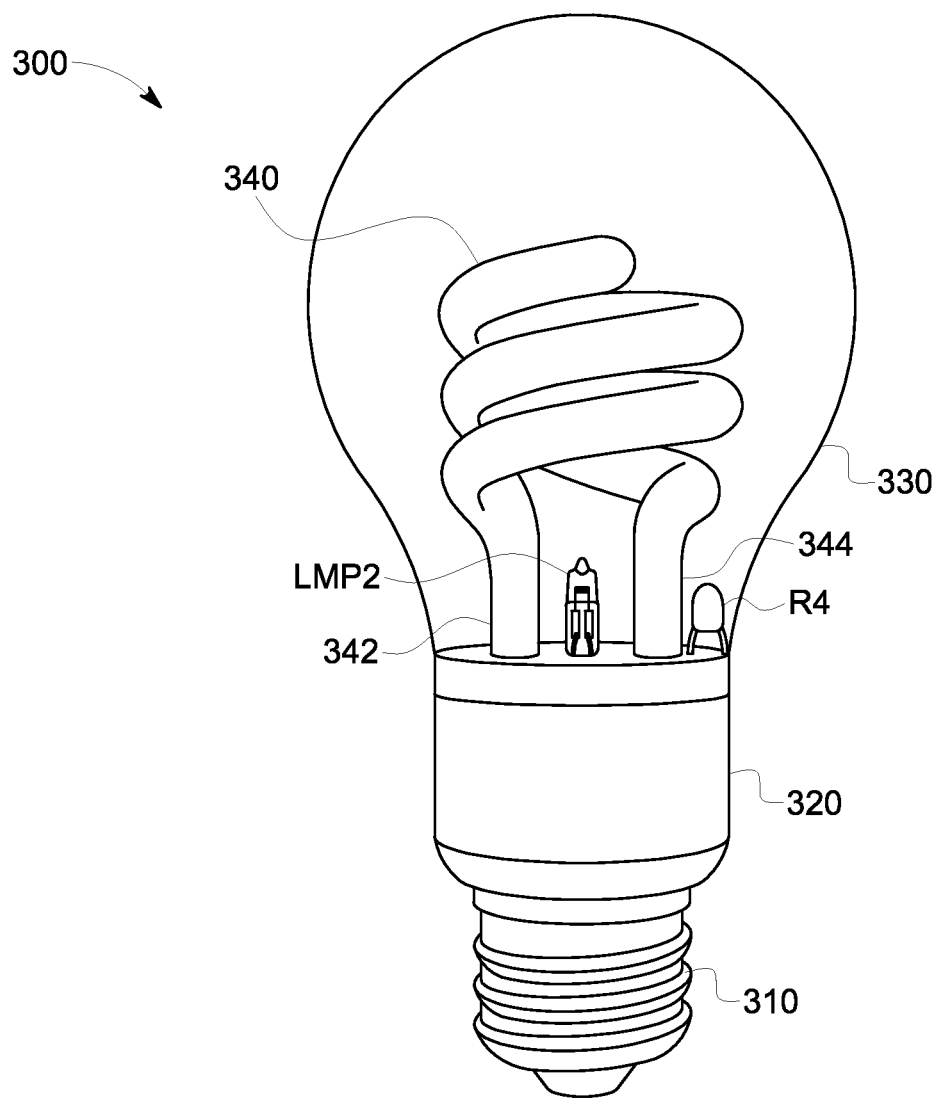
FIG. 3 depicts a BFTS CFL in accordance with embodiments.

FIG. 3 depicts BFTS CFL 300 in accordance with some embodiments. BFTS CFL 300 includes lamp base 310, which has two AC line voltage input terminals. Also included in the BFTS CFL are capper 320 and optical housing 330. Housed within optical housing 330 are CFL arc tube 340, secondary light source LMP2 and thermistor R4. For the depicted implementation, the secondary light source is a halogen lamp. Capper 320 houses electronic circuitry including a CFL ballast circuit and control circuit 200. Both electronic circuits are electrically coupled to the AC input terminals.

Arc tube 340 includes two ends 342, 344. Secondary light source LMP2 is positioned between the arc tube ends. Thermistor R4 is positioned adjacent arc tube end 344 distal from the secondary light source so that the thermistor is thermally shadowed by the arc tube end from direct heat radiating from the secondary light source.

BFTS CFL 300 is depicted as having the form of a conventional incandescent lamp. However, other implementations of BFTS CFL 300 having different forms are within the scope of this disclosure. In accordance with embodiments, BFTS CFL 300 need not include optical housing 330.

Figure 4:
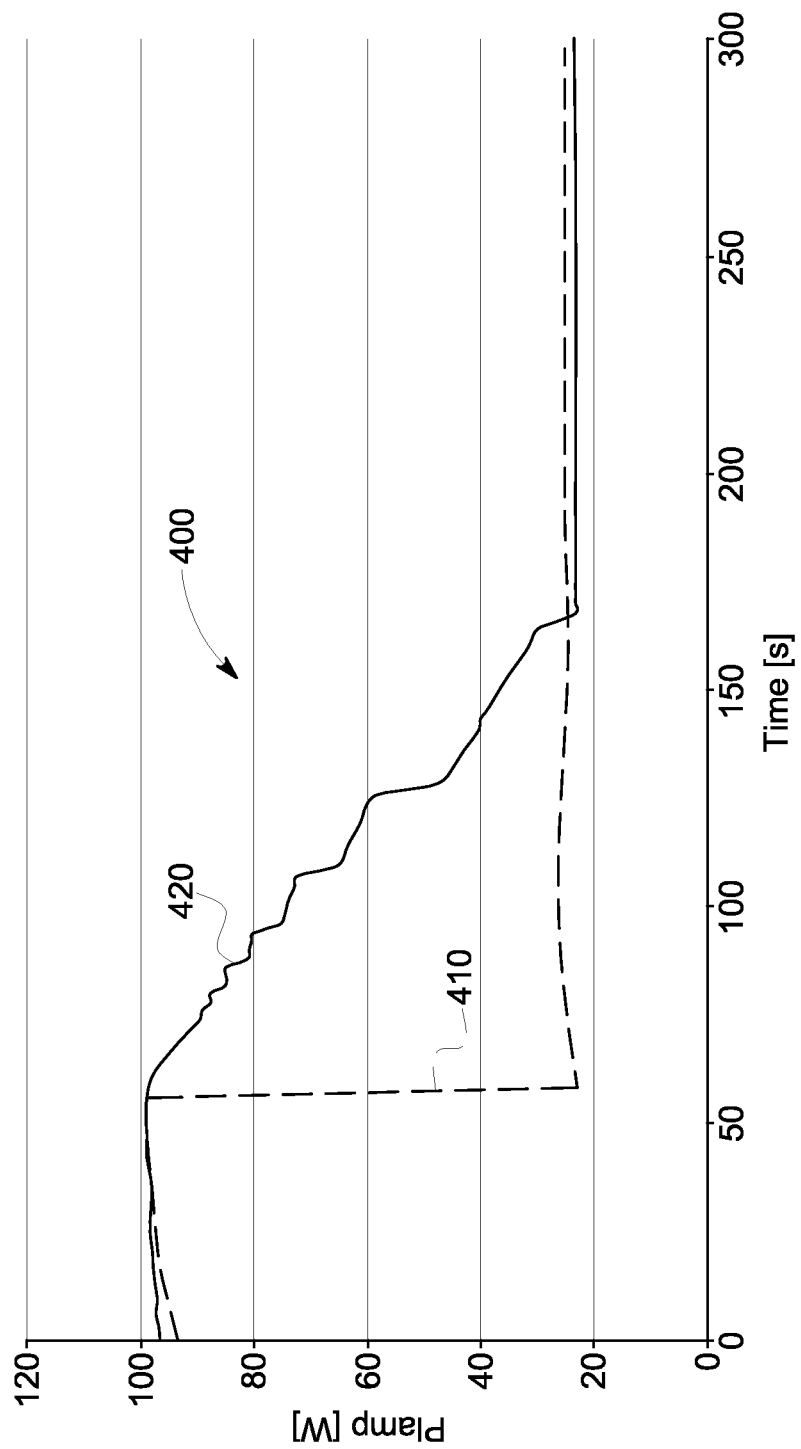
FIG. 4 depicts a graph presenting a power curve plot of a BFTS CFL in accordance with embodiments.

FIG. 4 depicts power curve plots 400 in accordance with embodiments. Power curve plot 410 represents the level of lamp power (watts) versus time for a conventional BFTS CFL. The lamp power for a conventional BFTS CFL drops nearly instantaneously after about 50 seconds. This instantaneous drop is coincident with the shutdown of the halogen secondary light source of the conventional BFTS CFL. After the halogen light source is extinguished, power curve 410 remains at about a constant level representing the power draw of the primary CFL light source.

Power curve plot 420 represents the level of lamp power (watts) versus time for a BFTS CFL in accordance with embodiments. As discussed above, in accordance with embodiments the secondary light source of a BFTS CFL is not instantly extinguished. Rather the secondary light source is dimmed at a controlled rate. This controlled rate is determined by the resistance change of thermally-shielded thermistor R4 and its impact on the charge available to diac D3 (FIG. 2). In the depicted example, power curve 420 decreases from about 50 seconds to 160 seconds. However, other controlled rates of varying slopes and durations are within the scope of this disclosure.

Figure 5:
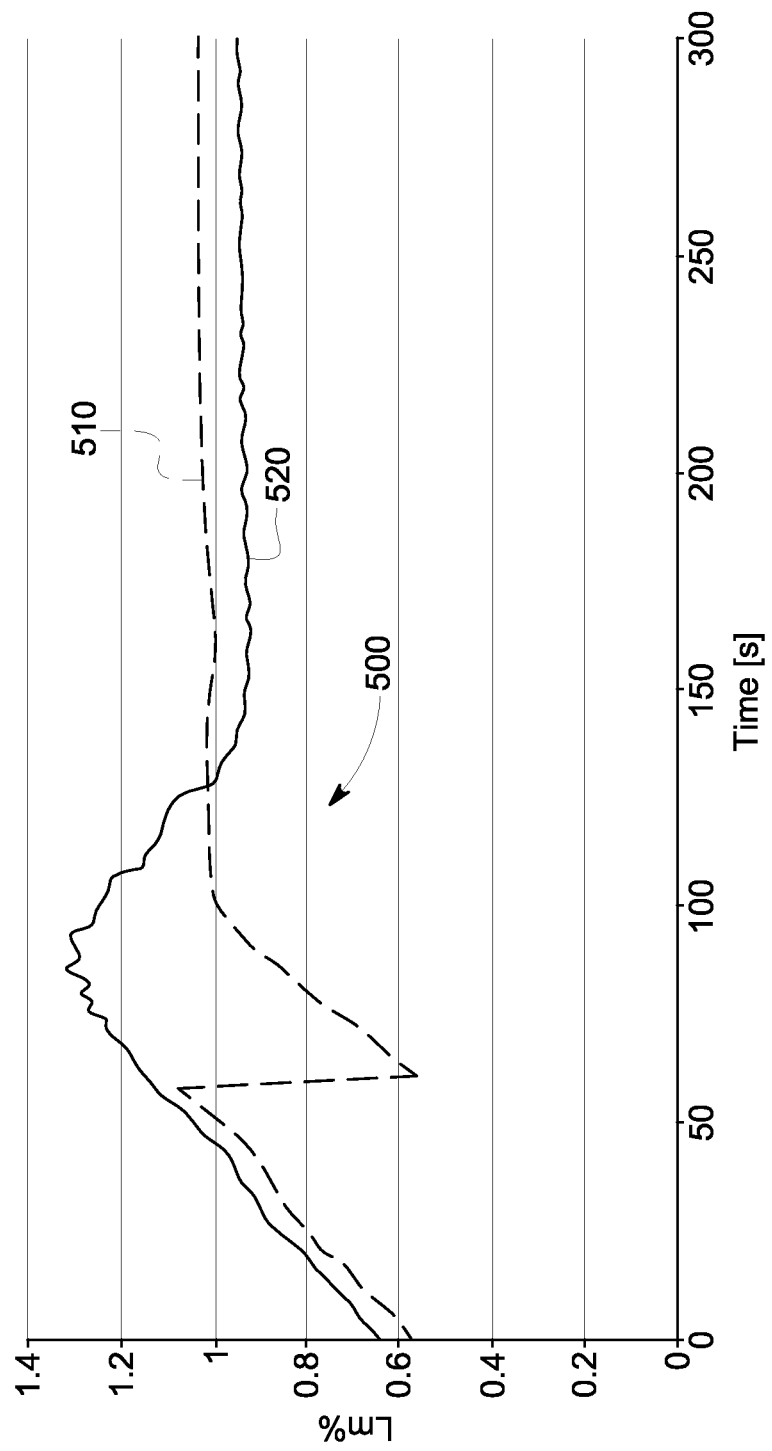
FIG. 5 depicts a graph presenting lumen output plots of a BFTS CFL in accordance with embodiments.

FIG. 5 depicts lumen output curve plots 500 in accordance with embodiments. Lumen output curve plot 510 represents the level of lamp lumen output (percentage normalized to a stable lumen output) versus time for a conventional BFTS CFL. The lamp lumen output for a conventional BFTS CFL drops nearly instantaneously after about 50 seconds. This instantaneous drop is coincident with the shutdown of the halogen secondary light source of the conventional BFTS CFL. After the halogen light source is extinguished, lumen output curve 510 remains at about a constant level representing the lumen output of the primary CFL light source.

Lumen output curve plot 520 represents the level of lamp lumen output (percentage) versus time for a BFTS CFL in accordance with embodiments. As discussed above, in accordance with embodiments the secondary light source of a BFTS CFL is not instantly extinguished. Rather the secondary light source is dimmed at a controlled rate. As illustrated in FIG. 5, a BFTS CFL in accordance with embodiments continues to have an increase in its lumen output, even as the power to the secondary light source is decreasing. This continued lumen output is a combination of the secondary light source and the primary CFL light source. In the depicted example, lumen output curve 520 decreases from about 90 seconds to 150 seconds. However, lumen output curve 520 remains at about 90 percent. Thus, a BFTS CFL in accordance with embodiments does not have a significant, perceptible change in its lumen output.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A lamp comprising:
a primary light source;
a secondary light source;
a secondary light source control circuit configured to provide an operating voltage to the secondary light source;
the secondary light source control circuit including a resistance element having an initial resistance changeable in response to the resistance element being exposed to a temperature above a predetermined threshold; and
the secondary light source control circuit including a charging branch resistance-capacitance time constant that is configured to change with a change in the resistance element resistance.

2. The lamp of claim 1, the secondary light source control circuit configured to be responsive to the changeable resistance to control a reduction in an emitted light intensity of the secondary light source.

3. The lamp of claim 1, wherein the resistance element is a thermistor.

4. The lamp of claim 1, wherein the resistance element is thermally shadowed by a heat shield.

5. The lamp of claim 4, wherein the resistance element is thermally shadowed from a terminal of the primary light source.

6. The lamp of claim 1, wherein the primary light source is a fluorescent arc tube.

7. The lamp of claim 1, wherein the secondary light source is one of a halogen light source and a pellet-dosed fluorescent lamp.

8. The lamp of claim 1, the secondary light source control circuit further including a triac in series with the secondary light source, the triac including a gate terminal.

9. The lamp of claim 8, the secondary light source control circuit further including a diac having a first terminal and a second terminal, the first terminal connected to the triac gate and the second terminal connected to a first terminal of the resistance element.

10. A lamp comprising:
a lamp base having two line voltage input terminals;
a primary light source and a secondary light source located distal from the lamp base;
a capper located adjacent to the lamp base;
a primary light source ballast circuit and a secondary light source control circuit, each circuit located in the capper;
the secondary light source control circuit including a resistance element having an initial resistance changeable in response to the resistance element being exposed to a temperature above a predetermined threshold; and
the secondary light source control circuit including a charging branch resistance-capacitance time constant that is configured to change with a change in the resistance element resistance.

11. The lamp of claim 10, the secondary light source control circuit configured to be responsive to the changeable resistance to control a reduction in an emitted light intensity of the secondary light source.

12. The lamp of claim 10, wherein the resistance element is a thermistor.

13. The lamp of claim 10, wherein the resistance element is thermally shadowed by a heat shield.

14. The lamp of claim 13, wherein the resistance element is thermally shadowed from a terminal of the primary light source.

15. The lamp of claim 10, the secondary light source control circuit further including a triac in series with the secondary light source, the triac including a gate terminal.

16. The lamp of claim 15, the secondary light source control circuit further including a diac having a first terminal and a second terminal, the first terminal connected to the triac gate and the second terminal connected to a first terminal of the resistance element.

17. The lamp of claim 10, the primary light source ballast circuit and the secondary light source control circuit connected in parallel to the line voltage input terminals.

* * * * *